(12) United States Patent
Di Genova

(10) Patent No.: US 11,834,276 B2
(45) Date of Patent: Dec. 5, 2023

(54) SHUTTLE FOR MOVING PACKAGES THROUGH A FILLING SYSTEM

(71) Applicant: Express Scripts Strategic Development, Inc., St. Louis, MO (US)

(72) Inventor: Gabriel Di Genova, Wildwood, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 121 days.

(21) Appl. No.: 17/513,600

(22) Filed: Oct. 28, 2021

(65) Prior Publication Data

US 2023/0136001 A1 May 4, 2023

(51) Int. Cl.
B65G 35/06 (2006.01)
B65G 47/94 (2006.01)
B65G 47/91 (2006.01)

(52) U.S. Cl.
CPC ............. *B65G 35/06* (2013.01); *B65G 47/91* (2013.01); *B65G 47/94* (2013.01); *B65G 2201/025* (2013.01)

(58) Field of Classification Search
CPC ........ B65G 35/06; B65G 47/91; B65G 47/94; B65G 2201/025; G07F 17/0092
USPC ................................ 198/343.1, 465.1, 750.1
See application file for complete search history.

(56) References Cited

U.S. PATENT DOCUMENTS

| 6,241,459 B1 | 6/2001 | Canella |
| 6,811,021 B1 | 11/2004 | Corley |
| 6,834,424 B2 | 12/2004 | Shannon |
| 7,065,940 B2 | 6/2006 | Dudek |
| 7,159,745 B2 | 1/2007 | Shannon |
| 8,452,446 B1 * | 5/2013 | Madris ................... A61J 7/0084 221/133 |
| 8,875,865 B2 * | 11/2014 | Terzini ..................... G07F 11/70 198/370.06 |
| 9,150,119 B2 * | 10/2015 | Henderson ............. B60M 1/346 |
| 9,586,760 B2 | 3/2017 | Nakajima |
| 9,669,163 B2 | 6/2017 | McNall, III |
| 9,676,566 B2 * | 6/2017 | Porat ......................... B07C 5/36 |
| 9,737,659 B2 | 8/2017 | Kriesel |
| 9,771,220 B1 | 9/2017 | Honeycutt |
| 10,294,091 B2 | 5/2019 | Eaton |
| 10,471,209 B2 | 11/2019 | Dunne |
| 10,478,647 B2 | 11/2019 | Murray |
| 11,289,181 B2 * | 3/2022 | Joplin .................... G06Q 50/28 |
| 2006/0260908 A1 | 11/2006 | Affaticati |
| 2015/0342318 A1 | 12/2015 | Arthur |

(Continued)

FOREIGN PATENT DOCUMENTS

CN 110884833 B 3/2020

OTHER PUBLICATIONS

US 2003/0221935A1, Dec. 4, Barklin et al. (Year: 2003).*

*Primary Examiner* — Douglas A Hess

(74) *Attorney, Agent, or Firm* — Dickinson Wright PLLC

(57) ABSTRACT

The shuttle system is configured to convey a container through a filling center. The shuttle system includes a shuttle and a base plate that is operably attached with the shuttle. A plurality of support members extend vertically upwardly from the base plate and surround a container receiving space. The support members are configured to directly contact side surfaces of the container and to support the container as the shuttle moves through the filling center without locking the container to the shuttle.

21 Claims, 15 Drawing Sheets

(56) References Cited

U.S. PATENT DOCUMENTS

2018/0354692 A1 12/2018 Mayden
2019/0064785 A1 2/2019 Wurman
2020/0339349 A1 10/2020 Frissenbichler

* cited by examiner

SHUTTLE FOR MOVING PACKAGES THROUGH A FILLING SYSTEM

BACKGROUND

Some filling centers, such as those found in high volume pharmacies, include shuttle systems that hold and transport containers through one or more filling stations where products are added to the containers. In some such shuttle systems, the acceleration and deceleration of the shuttle must be limited so as to avoid tipping the container held thereon and spilling its contents. Another approach is to lock the container to the shuttle, which may allow the shuttle to accelerate and decelerate quicker but which also requires additional time to effectuate the locking and unlocking process.

SUMMARY

An aspect of the present disclosure is related to a shuttle system for conveying a container through a filling center is provided. The shuttle system includes a shuttle and a base plate that is operably attached with the shuttle. A plurality of support members extend vertically upwardly from the base plate and surround a container receiving space. The support members are configured to directly contact side surfaces of the container and to support the container as the shuttle moves through the filling center without locking the container to the shuttle.

In an embodiment, the shuttle system further includes a rail, and the shuttle is configured to self-propel itself along the rail.

In an embodiment, the support members are made as separate pieces from the base plate and are fixedly attached with the base plate.

In an embodiment, the support members are fixedly attached with the base plate via at least one mechanical fastener.

In an embodiment, one of the support members is a first support member that extends vertically from the base plate by a first height to support the container when the base plate is tilted towards the first support member, and the other support members extend vertically form the base plate by respective heights that are less than the first height.

In an embodiment, in at least one filling station, the rail is tilted to tilt the shuttle and the container in a direction towards the first support member when the shuttle is in the at least one filling station to thereby allow contents to be added to the container more easily.

In an embodiment, one of the support members is a second support member and is positioned opposite of the first support member. The second support member includes two spaced apart fingers. A gripping device can grip the container in a space between the fingers when loading the container onto the shuttle or removing the container from the shuttle.

In an embodiment, an upper portion of at least one of the support members is angled away from the container receiving space to guide the container into the container receiving space.

In an embodiment, the shuttle system further includes a pattern that is configured to be attached with the base plate. The pattern has an outer periphery that matches an outer periphery of the container, and the support members can be attached to the base plate around the pattern.

In an embodiment, the base plate and the support members are made of metal.

Another aspect of the present disclosure is related to a pharmacy. The pharmacy includes a rail, which extends from a loading station, through at least one filling station, and to an unloading station. At least one shuttle is disposed on the rail and is configured to receive containers at the loading station and transport the containers to the at least one filling station where at least one pharmaceutical product can be loaded into the container and to the unloading station where the container can be removed from the shuttle. A controller is in communication with the at least one shuttle and controls the movement of the at least one shuttle through the pharmacy along the rail. The shuttle includes a base plate and a plurality of support members extending vertically from the base plate. The support members are spaced apart from one another to define a container receiving space, which receives the containers. When one of the containers is received in the container receiving space, the support members hold the container on the shuttle in a non-locking manner.

In an embodiment, the rail is angled within the at least one filling station to angle the container when the shuttle is in the at least one filling station. At least one of the support members extends vertically by a greater height than the other support members to hold the container when the container is angled in the at least one filling station.

In an embodiment, at least one of the loading and unloading stations includes a suction cup mechanism. One of the support members includes a pair of fingers that are spaced apart from one another so that the suction cup mechanism can access an outer surface of the container in an area between the fingers.

In an embodiment, the support members have upper portions that are angled away from the container receiving space for guiding the containers into the container receiving space.

In an embodiment, the support members are made as separate pieces from the base plate and are fixedly attached with the base plate.

Yet another aspect of the present disclosure is related to a method of operating a shuttle system. The method includes the step of, in a loading station, receiving a container into a container receiving space between a plurality of spaced apart support members that extend upwardly from a base plate of a shuttle. The support members hold the container in a non-locking manner. The method continues with the step of transporting the container with the shuttle from the loading station to at least one filling station. The method proceeds with the step of inserting at least one pharmaceutical product into the container in the at least one filling station. The method continues with the step of unloading the container from the shuttle in the unloading station.

In an embodiment, the method further includes the step of tilting the shuttle and the container in the at least one filling station. One of the support members extends to a greater height than the other support members to support the container when it is tilted.

In an embodiment, the step of inserting at least one pharmaceutical product occurs while the container is tilted.

In an embodiment, one of the support members includes a pair of spaced apart fingers, and the method further includes the step of gripping an outer surface of the container in a space between the fingers.

In an embodiment, the method further includes the step of fixedly attaching the support members with the base plate around a pattern which has an outer periphery that generally matches an outer periphery of the containers.

BRIEF DESCRIPTION OF THE DRAWINGS

These and other features and advantages of the present disclosure will become more readily appreciated when considered in connection with the following description of the presently preferred embodiments, appended claims and accompanying drawings, in which:

DESCRIPTION OF THE ENABLING EMBODIMENTS

One aspect of the present disclosure is related to a shuttle system for receiving and conveying containers through a loading system where contents (such as pharmaceutical products and packing materials) are loaded into the containers. The shuttle system includes a shuttle with a base plate and a plurality of support members that extend vertically upwardly from the base plate and that are spaced apart from one another to define a container receiving space. The support members are specifically designed to allow the container to be easily inserted into and removed from the container receiving space and to allow the container to be transported with the shuttle as the shuttle moves along a rail and even as the shuttle is tilted to allow for easier insertion of the contents into the container. These benefits are achieved without locking or otherwise fixedly attaching the container with the shuttle, while securing the container for movement throughout the fulfillment center. In another aspect, the presently described shuttle system can allow for automated insert and automated removal of containers, which may be somewhat deformable or no uniform in shape.

In an example, an automated process may mean a robotic, non-manual process for inserting containers, e.g., paper, paperboard, cardboard, corrugated or the like, into the shuttle, and for removal of the same after at least one fulfillment operation.

Figure 1:
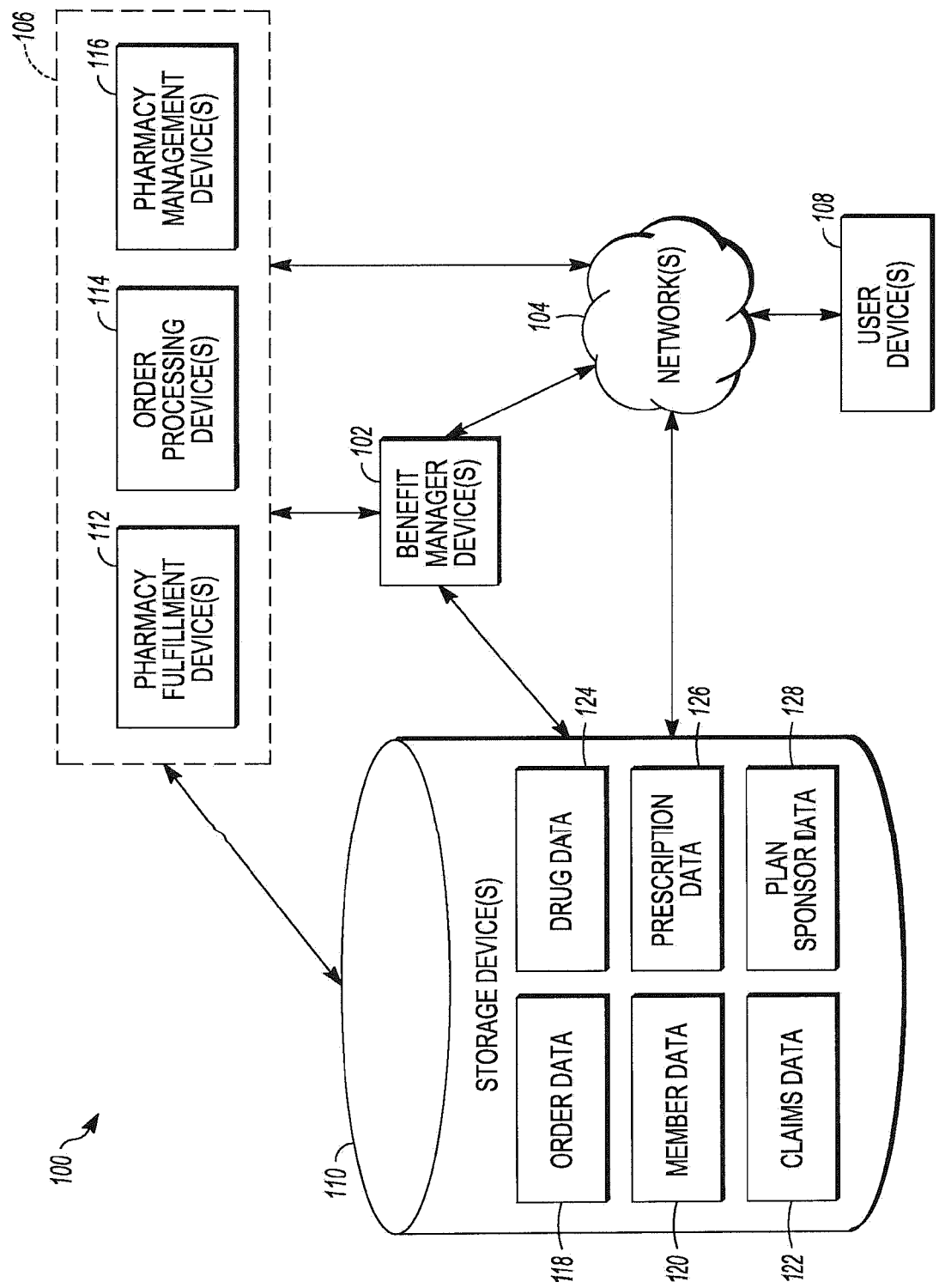
FIG. 1 is a block diagram of an example system according to an example embodiment.

In an embodiment, the shuttle system is implemented within a high-volume pharmacy or fulfillment center (e.g., a mail order pharmacy, a direct delivery pharmacy, an automated pharmacy, a multiple package delivering center, and the like). FIG. 1 depicts a block diagram of an example pharmaceutical fulfillment system 100 that could be deployed in such a high-volume pharmacy or fulfillment center A high-volume pharmacy may be a pharmacy that is capable of filling prescriptions automatically, mechanically, manually, or a combination thereof. The system 100 and/or the components thereof may otherwise be deployed in a lower volume pharmacy. The pharmacy may also fill prescription orders including highly regulated drugs in a secure manner.

The system 100 may include a benefit manager device 102, a pharmacy device 106, and a user device 108, which may communicate either directly and/or over a network 104. The system may also include a storage device 110.

The benefit manager device 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefit including a medical or health benefit; a dental benefit; a vision benefit; a radiology benefit; a pet care benefit; an insurance benefit; a long-term care benefit; a nursing home benefit; and the like. The PBM may, in addition to its PBM operations, operate one or more than one pharmacy.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery, from a mail order pharmacy location, which may be the high-volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, prepared by the high-volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HSA) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim, no copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location. Such a copayment may change depending on whether a prescription is filled manually or through at least partially automated fulfillment processes as described herein In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility for the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the operations mentioned herein. For example, the PBM can route the prescription order to an automated pharmacy fulfillment system as described herein.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, $3^{rd}$ Generation Partnership Project (3GPP) network, an Internet Protocol (IP) network, a Wireless Application Protocol (WAP) network, a WiFi network, or an IEEE 802.11 standards network, as well as various combinations thereof. The network 104 may include an optical communication network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Virginia.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100 or may otherwise be used. The pharmacy fulfillment device 112 may include an item dispenser that includes a door as described herein. The door may include devices to stage groups of items, e.g., medication, small solids, or the like, for dispensing into an appropriate container. The containers can be tracked in the pharmacy fulfillment device 112 and/or the order processing device 114. The door may include apertures, openings or slots through which power lines can extend from inside the door to outside the door to allow movement of the door and maintenance of the door without completely disconnecting all bundled lines in the door. In an example embodiment, the pharmacy fulfillment device 112 can include the shuttle and at least partially automated fulfillment system and methods as described herein.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy. In an example embodiment, the order processing device 114 can include shuttle operations as described in U.S. Provisional Patent Nos. 63/272,667 and 63/272,671, which are hereby incorporated by reference.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112, inclusive of tracking the shuttle, the container on the shuttle and objects being placed in the container. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together. The order processing device 114 may also control track operations and direct an individual shuttle to a specific location in the fulfillment center such that a specific object can be placed in the container or select tasks can be performed at workstations.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device 114, and/or the pharmacy management device 116 may include circuitry, a processor, a memory to store data and instructions, and communication functionality. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems or may be a multi-use device that has functionality outside off analysis of the methods and systems. In some embodiments, the computing system may include a mobile computing device. For example, the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used. The user device 108 running an application becomes a dedicated device when executing the application.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

Figure 2:
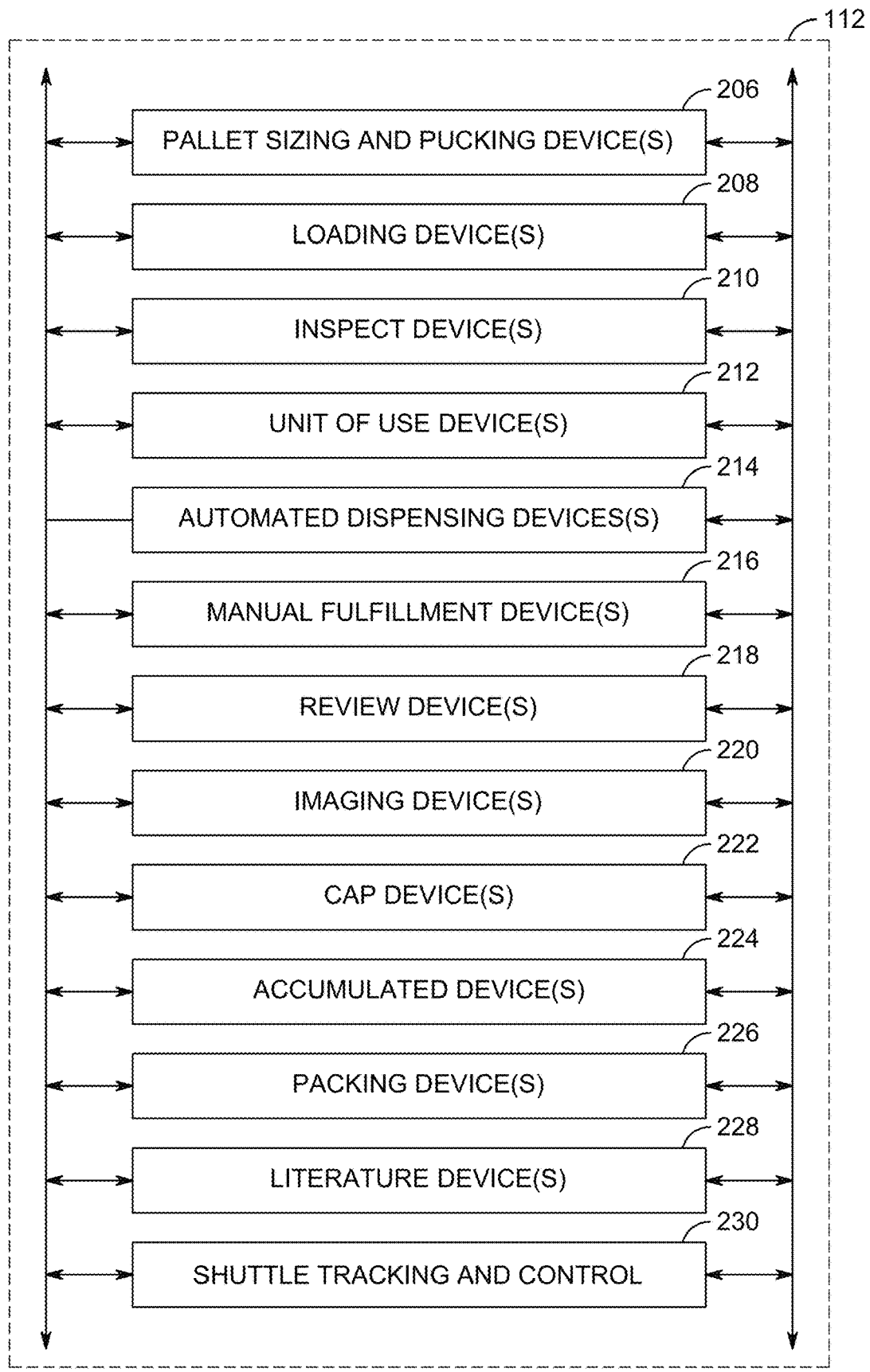
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 212, automated dispensing device(s) 214, manual fulfillment device(s) 214, review device(s) 218, imaging device(s) 220, cap device(s) 222, accumulation device(s) 224, packing device(s) 226, and literature device(s) 228. Further, the pharmacy fulfillment device 112 may include additional devices, which may communicate with each other directly or over the network 104.

In some embodiments, operations performed by one or more of these devices 206-228 may be performed sequentially, or in parallel with the operations of devices as may be coordinated by the order processing device 114. In some embodiments, the order processing device 114 tracks a prescription with the pharmacy based on operations performed by one or more than one of the devices 206-228.

In some embodiments, the pharmacy fulfillment device 112 may transport prescription drug containers, for example, between more than one of the devices 206-228 in a high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping or may be shipped in combination with other prescription drugs dispensed by other devices (e.g., in the high-volume fulfillment center).

At least some of the operations of the devices 206-228 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers (HVFs) that fill a number of prescription drug types at a rapid rate and blister pack machines that dispense and pack drugs into a blister pack. Prescription drugs dispensed by the automated dispensing devices 214 may be packaged individually or collectively for shipping or may be shipped in combination with other prescription drugs dispensed by other devices in the high volume fulfillment center. The automated dispensing device 214 may include a counter to count medications from a hopper and dispense to a specified container through a dispensing door structure to stage and to guide the drug items to the specified container.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high-volume fulfillment center.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high-volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high-volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order.

The packing device 226, which is discussed in further detail below, packages prescription orders in preparation for shipping the order.

The pharmacy fulfillment device 112 in FIG. 2 may include single devices 206-228 or multiple devices 206-228 (e.g., depending upon implementation in a pharmacy). The devices 206-228 may be the same type or model of device or may be different device types or models. When multiple devices are present, the multiple devices may be of the same device type or models or may be a different device type or model. The types of devices 206-228 shown in FIG. 2 are example devices. In other configurations of the system 100, lesser, additional, or different types of devices may be included.

Moreover, multiple devices may share processing and/or memory resources. The devices 206-228 may be located in the same area or in different locations. For example, the devices 206-228 may be located in a building or a set of adjoining buildings. The devices 206-228 may be interconnected (e.g., by conveyors), networked, and/or otherwise in contact with one another or integrated with one another (e.g., at the high-volume fulfillment center), e.g., using a track on which shuttles move. In addition, the functionality of a device may be split among a number of discrete devices and/or combined with other devices.

Shuttle tracking and control 230 may be in communication with the bus. Shuttle tracking and control includes communication modules that read data from the shuttle and provide instructions to the shuttle wherein to remain at a location or proceed to the next location. A track controller can configure the track so that the shuttle, which may carry a pallet or container, travels to the assigned next location as determined by shuttle tracking and control 230, see, e.g., U.S. Provisional Patent App. Nos. 63/272,667 and 63/272,671, which are hereby incorporated by reference.

Figure 3:
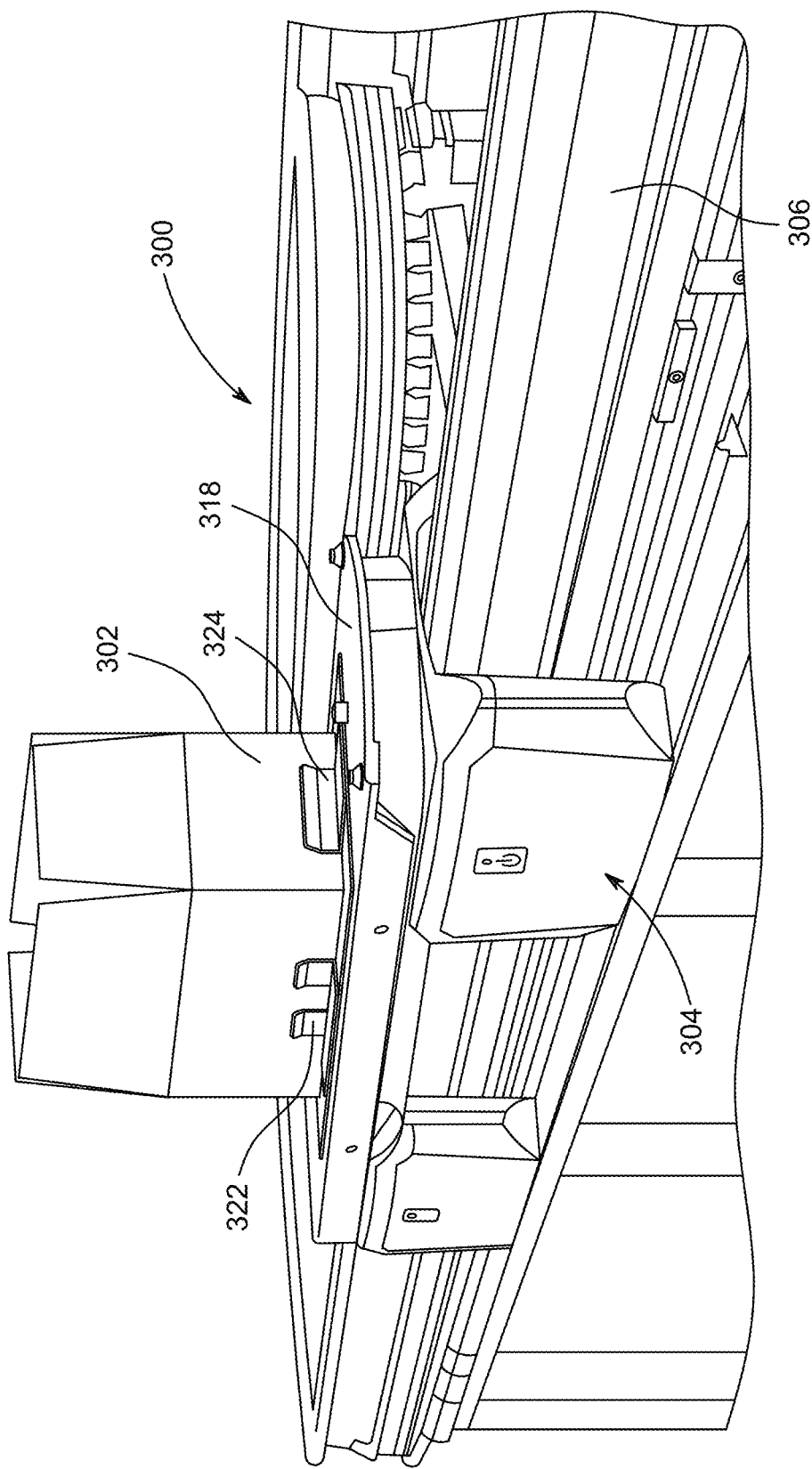
FIG. 3 is a perspective and fragmentary view of an exemplary embodiment of a shuttle system constructed according to an exemplary embodiment of the present disclosure.

Referring now to FIG. 3, a shuttle system 300 is provided for transferring containers 302 through a packaging area of the high-volume pharmacy and for holding those containers 302 while they are filled with pharmaceutical products and packaging materials. In the exemplary embodiment, these containers are corrugated or cardboard boxes 302, and therefore, the containers are hereinafter referred to as "boxes." However, in some embodiments, the containers could be environmentally sealed coolers or could be other types of containers that have generally rigid side walls. Further, in some embodiments, the packaging area could be in a different, non-pharmaceutical setting and the shuttle system could be for non-pharmaceutical products. The boxes can include receptacles made from paper, paperboard, cardboard, corrugated or the like. The boxes can include receptacles made from thin polymer material that may be flexible. The boxes can include receptacles that are flexible when being handled, e.g., inserted, lifted or moved. In an example embodiment, the boxes may be non-uniform in size.

Figure 9:
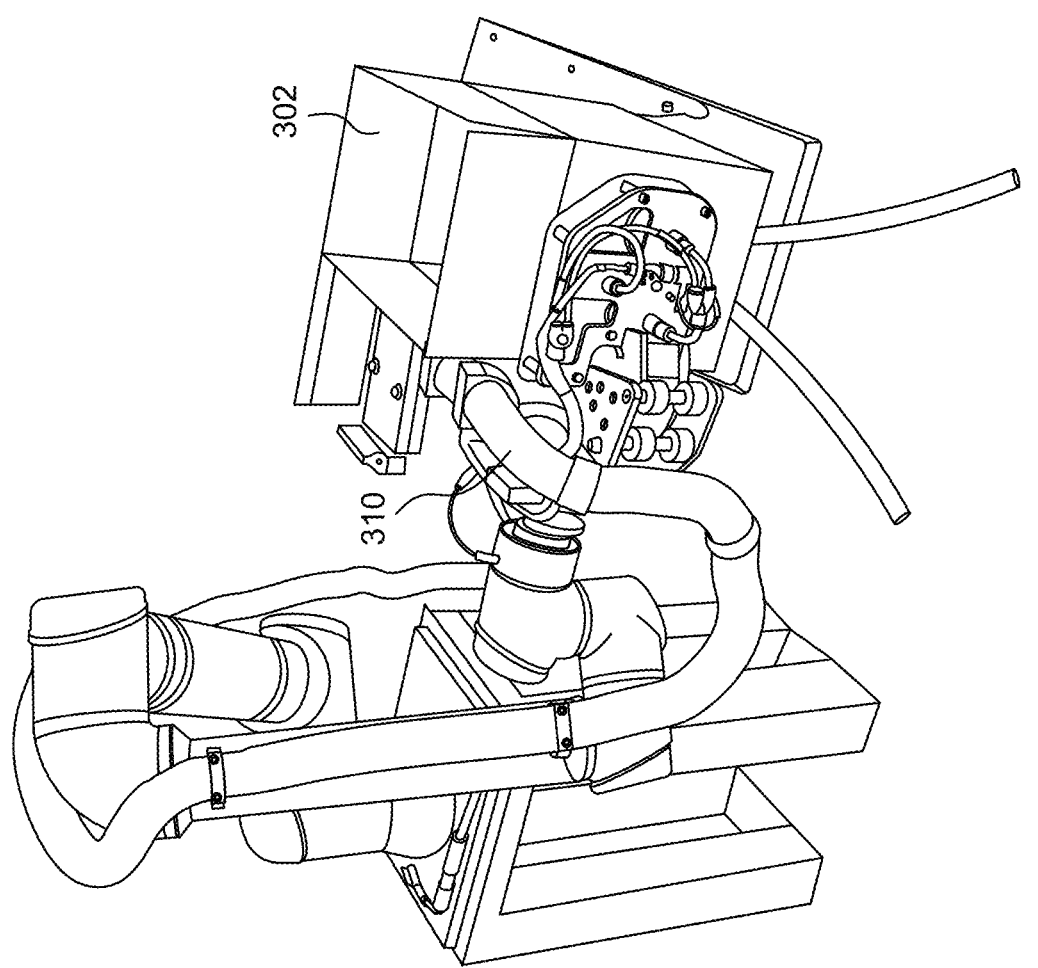
FIG. 9 is a perspective elevation view of a loading station where a box is loaded onto a shuttle.

The shuttle system 300 includes a plurality of shuttles 304, each of which is self-propelled and has a holding device for holding a single box 302 and guiding the box 302 through the packaging area. A single rail 306 or track extends along a path from a loading station (see FIG. 9) where empty boxes 302 are loaded onto the shuttles 304 to an unloading station (see FIG. 10) where filled boxes 302 are transferred to a conveyor 308 and ultimately to a shipping area for shipment to their intended destinations. The boxes 302 remain with their tops opened as the shuttle 304 guides the box along the rail 306. At either the loading or the unloading station, a robot 310 may grasp the outside surface of a box 302 with one or more suction cups 312 and lift the box 302 and either place the box 302 onto the shuttle 304 or remove the box 302 from the shuttle 304 and place it onto the conveyor 308. In the exemplary embodiment, the robot 310 is a six-axis robotic arm and includes a plurality of spaced apart suction cups 312, each of which can grasp the outer surface of the box 302.

Figure 4:
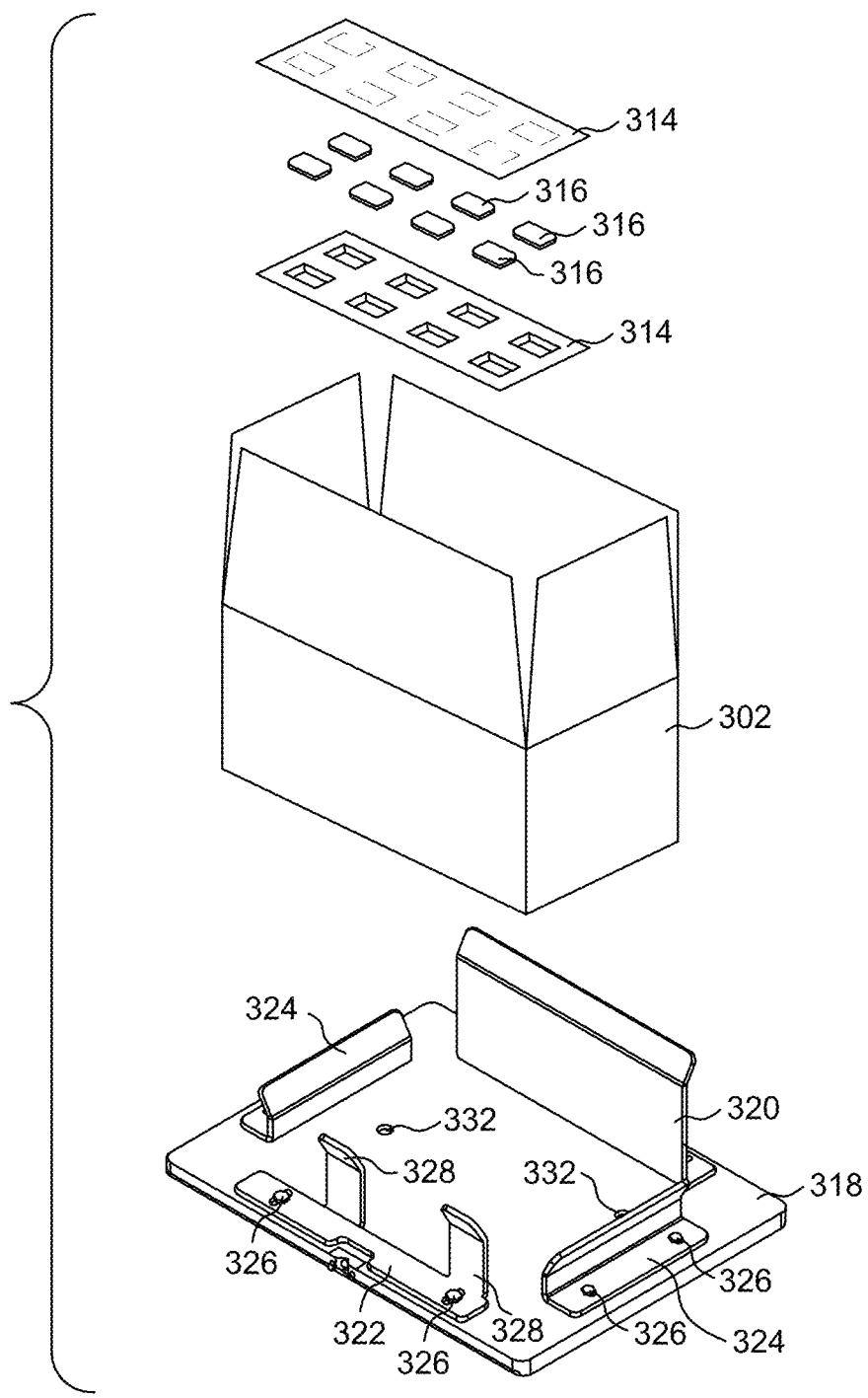
FIG. 4 is an exploded view of a holding device and a box and its contents.
Figure 5:
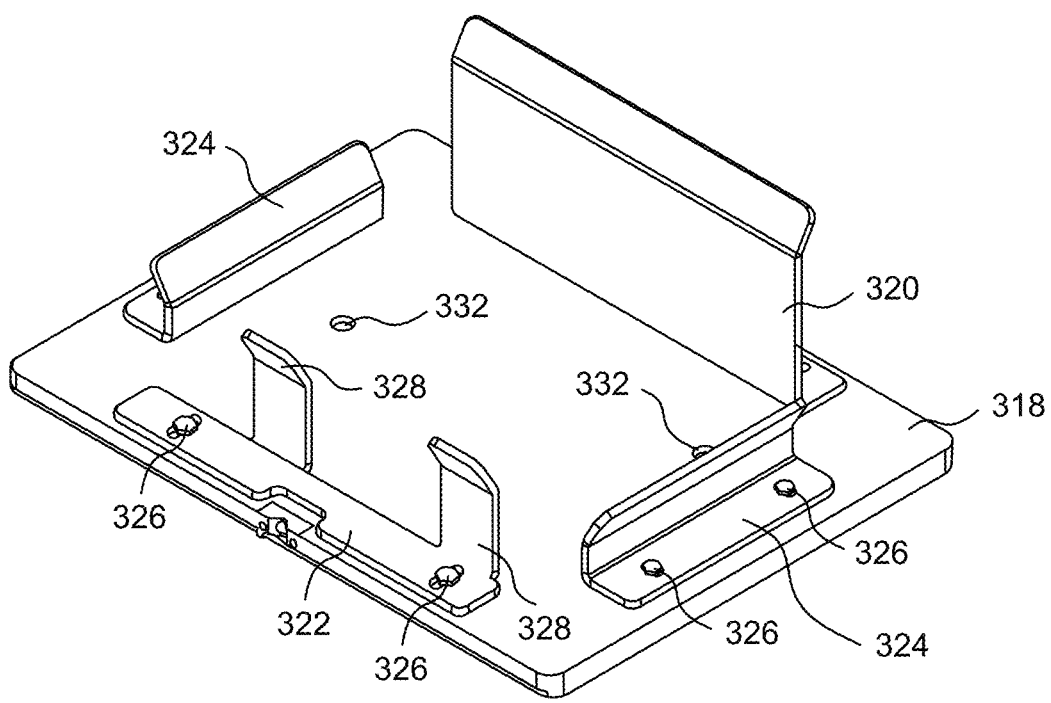
FIG. 5 is a perspective elevation view of a holding device constructed according to an exemplary embodiment.

In between the loading and unloading stations, the rail passes 306 through one or more filling stations (see FIG. 11) where the pharmaceutical products can be either automatically (such as by a robot) or manually added to the box 302. With reference to FIG. 4, in the exemplary embodiment, the pharmaceutical products include upper and lower packaging trays 314 and a plurality of pharmaceuticals 316 (for example, pill containers, syringes, unit-of-use packages, etc.) are added to the box 302 in the filling stations. Additional materials (for example, literature materials to accompany the pharmaceuticals 316, syringes, a sharps box, mixing cups, etc.) may also be added to the box 302 in one or more filling stations. In some embodiments, the contents that is added to the box can take a range of different forms apart from pharmaceutical products.

Each shuttle 304 includes at least one drive wheel (not shown) that is operably connected with an electric motor (not shown) for driving the shuttle 304 along the rail 306. A power source and communication means are built into the rail 306 so that the shuttle 304 does not have to carry a battery or a communications module for communication with an external controller, which simultaneously controls the movement of many shuttles 304 along the rail 306 so that multiple boxes 302 can be filled simultaneously. In some embodiments, each shuttle 304 includes a battery (not shown) for powering the motor and a wireless communications module for communicating with the external controller.

Referring now to FIGS. 3-8, the holding device of the shuttle 304 includes a generally planar base plate 318 that is held above the rail. In the exemplary embodiment, the base plate 318 is generally rectangular in shape and with a constant thickness. A plurality of box supports 320, 322, 324 (or support members or support guides) are disposed on a top surface of the base plate 318 and are spaced apart from one another to define a receiving space that is shaped to retain the box 302 on the shuttle 304 as the shuttle 304 moves along the rail 306 and even when the shuttle 304 is tipped at an angle, as described in further detail below. In the exemplary embodiment, the base plate 318 and the box supports 320, 322, 324 are made of metal, such as steel, an alloy steel, aluminum, an aluminum alloy, etc. In other embodiments, these components are made of other materials, such as plastics, ceramics, or composites.

In the exemplary embodiment, the plurality of box supports 320, 322, 324 includes four box supports 320, 322, 324 that are specifically placed on the base plate 318 to contact the four side walls of the box 302 when the box 302 is resting on the base plate 318. The box supports 320, 322, 324 are made as separate pieces from the base plate 318 and extend upwardly from the base plate 318. Each box support 320, 322, 324 is generally L-shaped as viewed in cross-section with a short leg that is fixedly attached with a top surface of the base plate 318 and a long leg that rises vertically upwardly away from the base plate 318. In this example embodiment, the box supports 320, 322, 324 are fixedly attached with the base plate 318 inwardly of an outer periphery of the base plate 318. A box support 320, 322, 324 may be cantilevered from the base plate 318 with its free end extending outwardly from the center of the base plate 318. The outward angle of the top portion of the box support 320, 322, 324 can be in the range of five to thirty degrees relative to the vertical elongate part of the box supports 320, 322, 324. The angled top portion of the box support 320, 322, 324 has a height that is less than the vertical portions of the support in the first and second box supports 320, 322. In an example embodiment, the angled top portion of each of the types of box supports 320, 322, 324, e.g., the first, second and third supports 320, 322, 324, have the same height. However, as the end, third supports 324 are shorter the angled portion is between ninety percent and one hundred-ten percent the height of the vertical portion of the third support 324. The angled portion of the first box support 320 is about ten percent to twenty percent the height of its vertical portion. The angled portion of the first box support 320 is about ten percent to twenty percent the height of its vertical portion. While shown with each box support 320, 322, 324 having the same outward angle, the first box support 320 may have no angle or a smaller angle than the second or third box supports 322, 324. This will assist the first box support 320 in holding the box 302 in place when the box 302 on the shuttle 304 is tilted.

In some embodiments, one or more of the box supports 320, 322, 324 may be mounted on or operably coupled with springs that bias the box supports 320, 322, 324 against the box 302. The springs chosen are selected to have a spring force that holds the box 302 tightly without impeding the insertion of the box 302 into the box receiving space or the removal thereof.

Figure 13:
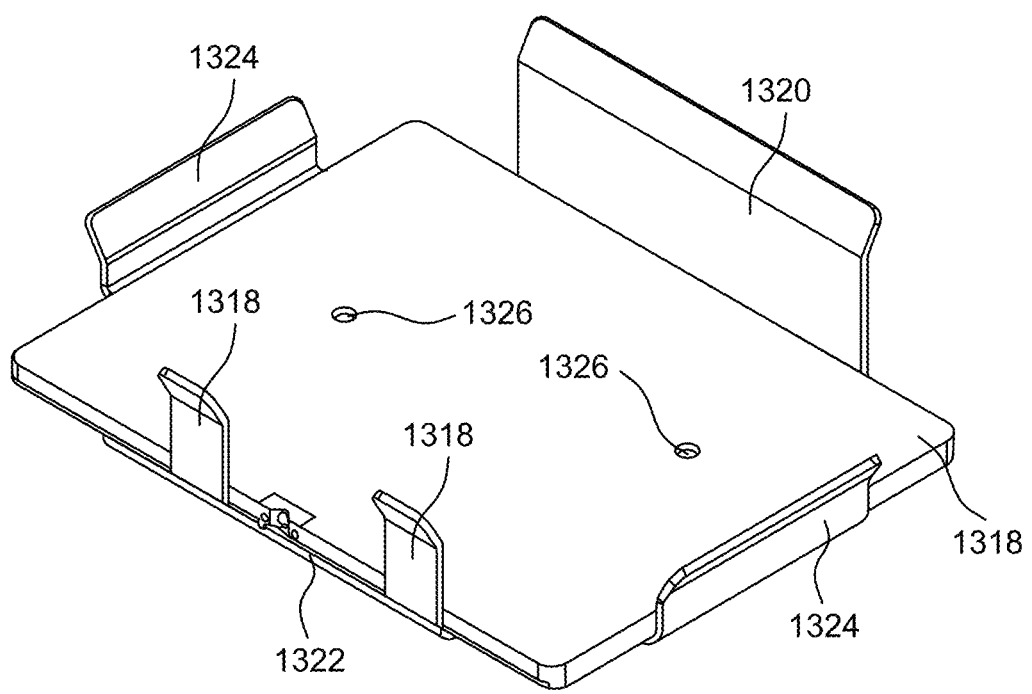
FIG. 13 is a perspective view of another exemplary embodiment of the holding device.

FIG. 13 depicts an alternate embodiment of the box supports 1320, 1322, 1324, with like numbers, separated by a prefix of "13," identifying like components with the above-described embodiments. In this embodiment, the box supports 1320, 1322, 1324 are fixedly attached with a bottom surface of the base plate 1318 and wrap around the peripheral edges of the base plate 1318 to extend vertically upwardly above the top surface of the base plate 1318. In an example, the free ends of the cantilevered box supports 1320, 1322, 1324 can extend inwardly toward the center of the base plate 1318. In another example, the intermediate portion of the box supports 1320, 1322, 1324 can wrap around the base plate 1318 and firstly extend upwardly and then back outwardly, e.g., the same structure above the base plate 1318 as shown in FIGS. 3-8.

Figure 14:
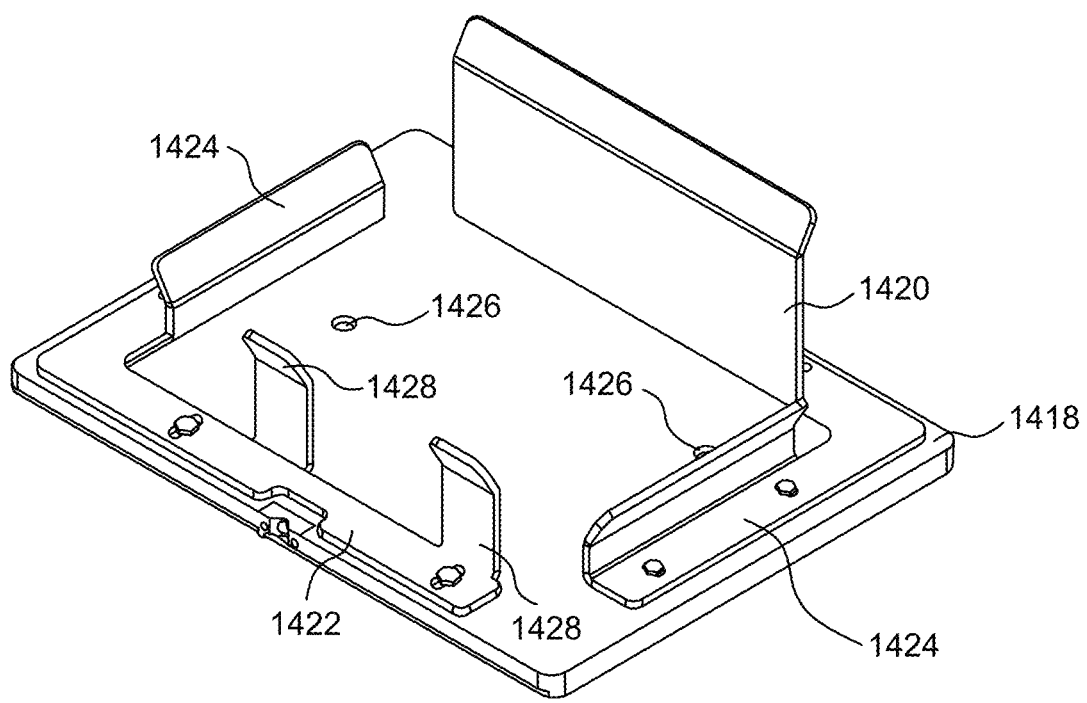
FIG. 14 is a perspective view of yet another exemplary embodiment of the holding device.

FIG. 14 depicts another alternate embodiment of the box supports with like numerals, separated by a prefix of "14," identifying like components with the above-discussed embodiments. In this embodiment, the first and third box supports 1420, 1424 are formed as a single, monolithic piece with one another, and the second and fourth box supports 1422, 1424 are formed as a single, monolithic piece with one another. Thus, in this embodiment, the process of attaching the box supports 1420, 1422, 1424 with the base plate 1418 may be effectuated more quickly. In another example embodiment, the box supports can be formed from a single monolithic component that extends around the perimeter of the base plate to define the box receiving space.

Referring back to FIGS. 3-8, the base plate 318 has a plurality of pre-drilled and tapped holes and each box support 320, 322, 324 has a pair of through openings. Fasteners (such as bolts) 326 extend through the through openings of the box supports and threadedly engage with the holes of the base plate 318 to fixedly attach the box supports 320, 322, 324 with the base plate 318. The through openings in the box supports 320, 322, 324 are elongated to allow the positioning of the box supports 320, 322, 324 to be adjusted into precise locations around a pattern in a manner described in further detail below prior to tightening to ensure the box supports 320, 322, 324 are properly located to hold the box 302. This attachment process is described in further detail below. In some other embodiments, the box supports 320, 322, 324 may be fixedly attached with the base plate 318 through other attachment means, such as welding, brazing, adhesives, or other types of mechanical fasteners. In still other embodiments, the box supports 320, 322, 324 may be monolithic with the base support 318 with the entire holding device being made as a single piece of metal (such as formed through a casting, forging, and/or machining operation) or being made as a single piece of plastic that is shaped through an injection molding operation.

The four box supports 320, 322, 324 include a first box support 320, a second box support 322, a third box support 324, and a fourth box support 324. The first and second box supports 320, 322 are adapted for engaging the long side walls of the rectangular box 302 and are thus longer than the third and fourth box supports 324, which are adapted for engaging the short side walls of the rectangular box 302. In the example embodiment, the first and second box supports 320, 322 have equal first lengths and the third and fourth box supports 324 have equal second lengths. Moreover, the third and fourth box supports 324 are identical in construction with their long legs facing towards each other. Because the third and fourth box supports 324 are identical with one another, this lends itself to cost savings through economies of scale. An upper portion of each of the four box supports 320, 322, 324 is curved outwardly towards a periphery of the base plate 318 to guide the boxes 302 into the receiving space between the box supports 320, 322, 324 when the box 302 is placed onto the shuttle 304. While the box supports 320, 322, 324 are described for ease of description, it will be recognized that the box supports 320, 322, 324 can be positioned to support a square cross sectional box with the third and fourth box supports 324 being the front and rear supports and the first and second box supports 320, 322 being the side supports, with reference to the travel of the shuttle 304.

Figure 11:
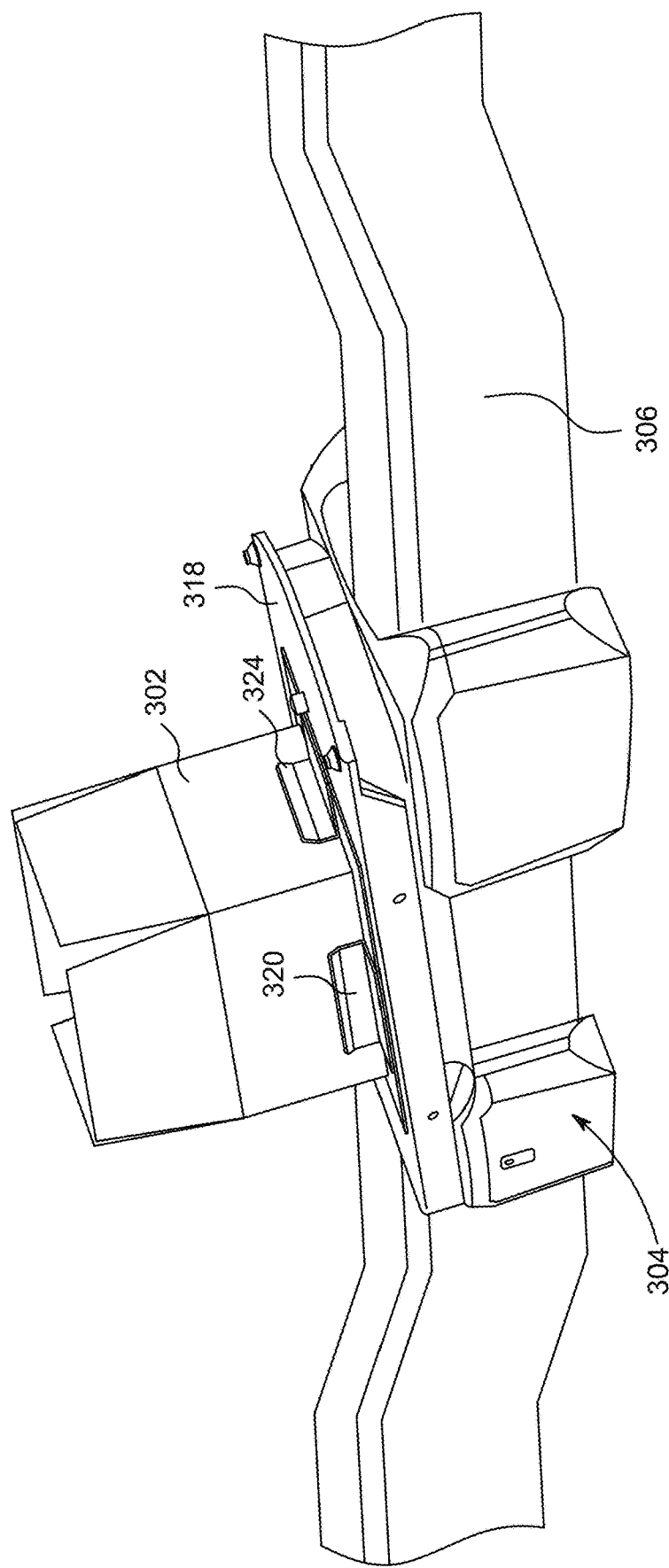
FIG. 11 is a perspective view of a filling station where a box can be filled with pharmaceutical products.

The long leg of the first box support 320 is generally plate-like along its entire length and extends upwardly at a constant first height. The first height is preferably at least half the height of the box 302 and more preferably approximately seventy-five percent (75%) of the box 302 for supporting the box 302 when the box 302 is tilted in the filling station, as shown in FIG. 11 and discussed in further detail below. In an embodiment, the first height is at least two inches less than a height of the box 302 so that a machine readable code (such as a barcode, a QR code, a 2D code, an alphanumeric code or the like) can be printed onto the box 302 above the first box support 320 while the box 302 is on the shuttle 304. In an example, the height of the first box support 320 is between half and three-quarters of the height of the box 302. This also allows reader devices downstream along the rail to read the machine code over the top of the side, first box support 320. The length of the first box support 320 extends up to about 80% to 90% the side length of the box 302 to be held in the box receiving space. In an example embodiment, the length of the first box support 320 is greater than half the length of the box 302 to be held in the box receiving space.

Figure 10:
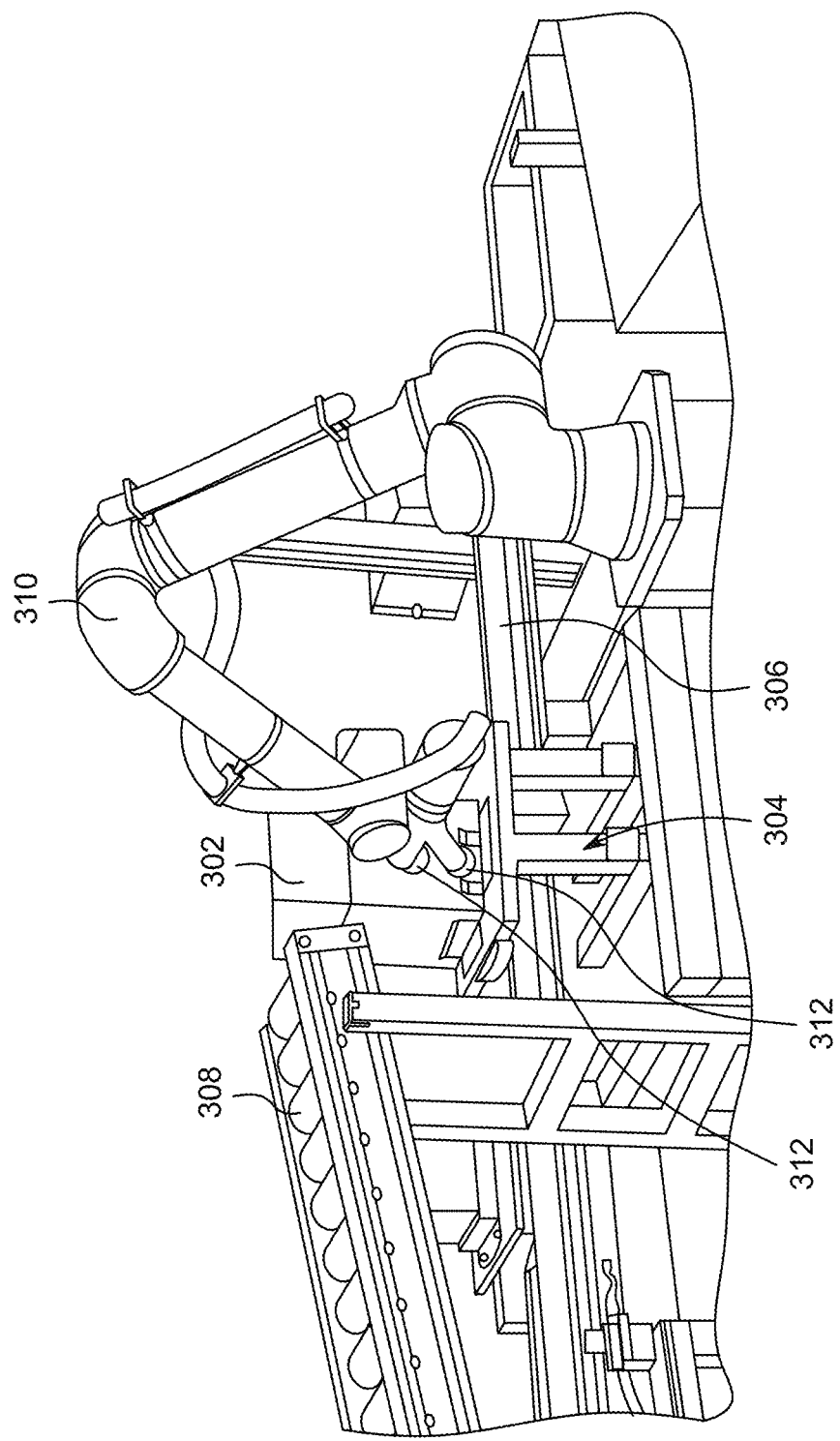
FIG. 10 is a perspective view of an unloading station where a box is unloaded from a shuttle.

The second box support 322 includes two spaced apart fingers 328 that extend upwardly in spaced and parallel relationship with one another by a second height, which is less than the first height. The second box support 322 is positioned at the opposite side of the first box support 320. When a new, empty box 302 is inserted into the box receiving space of the shuttle 304 and when a full box 304 is removed from the box receiving space (intermediate the box supports 320,322, 324), one or more of the suction cups 312 can grip the side wall of the box 302 in the space between the two fingers 328 of the second box support 322, as shown in FIG. 10. The two fingers 328 are sized to engage the box 302 along less than half the length of the box 302 to be received in the box receiving space. In an example embodiment, the two fingers 328 are sized to engage the box 302 along less than one-third the length of the box 302 to be received in the box receiving space. In an example embodiment, the two fingers 328 are sized to engage the box 302 at least one-quarter the length of the box 302 to be received in the box receiving space. In an example embodiment, a lower section of the fingers 328 may be connected by a section of wall, which has a height less than the fingers 328 and allows the grippers to still engage a box 302 that is within the box receiving space. The width of the fingers 328 is determined by the space needed for the gripper's end-of-arm tooling to engage the box 302 for insertion into the box receiving space or removal from the box receiving space.

The end, third box supports 324 includes extend upwardly from the base plate 318 at a third height, which is less than the second height and the first height. The third box supports 324 are positioned on the opposite ends of the base plate 318, one on the front and one on the back. The third height is between ten percent and twenty-five percent the height of the box 302. However, the third height is not higher than fifty percent of a height of the box 302, in an example embodiment. The length of the third box support 324 extends up to about 80% to 90% the end length of the box 302 to be held in the box receiving space. In an example embodiment, the length of the third box support 324 is greater than half the length of the box 302 to be held in the box receiving space.

In the exemplary embodiment, the box supports 320, 322, 324 are made of metal that is thick enough to resist deformation when contacted as may occur in the environment that the shuttle system 300 operates, e.g., by robotic equipment or the box 302 being placed into or removed from the box receiving space. The box supports 320, 322, 324 can be shaped by cutting the metal, such as with wire electrical discharge machining (EDM) or laser cutting and then bending the box supports 320, 322, 324 to their respective final shapes. In the exemplary embodiment, following cutting and before bending, the first, third, and fourth box supports 320, 324 are generally rectangular in shape (when viewed from the side), and the second box support 322 is generally capital F shaped. The top, free ends of the box supports 320, 322, 324, in some embodiments, do extend outwardly from the box receiving space as defined in the central portion of the base plate intermediate the four box supports 320, 322, 324.

Figure 6:
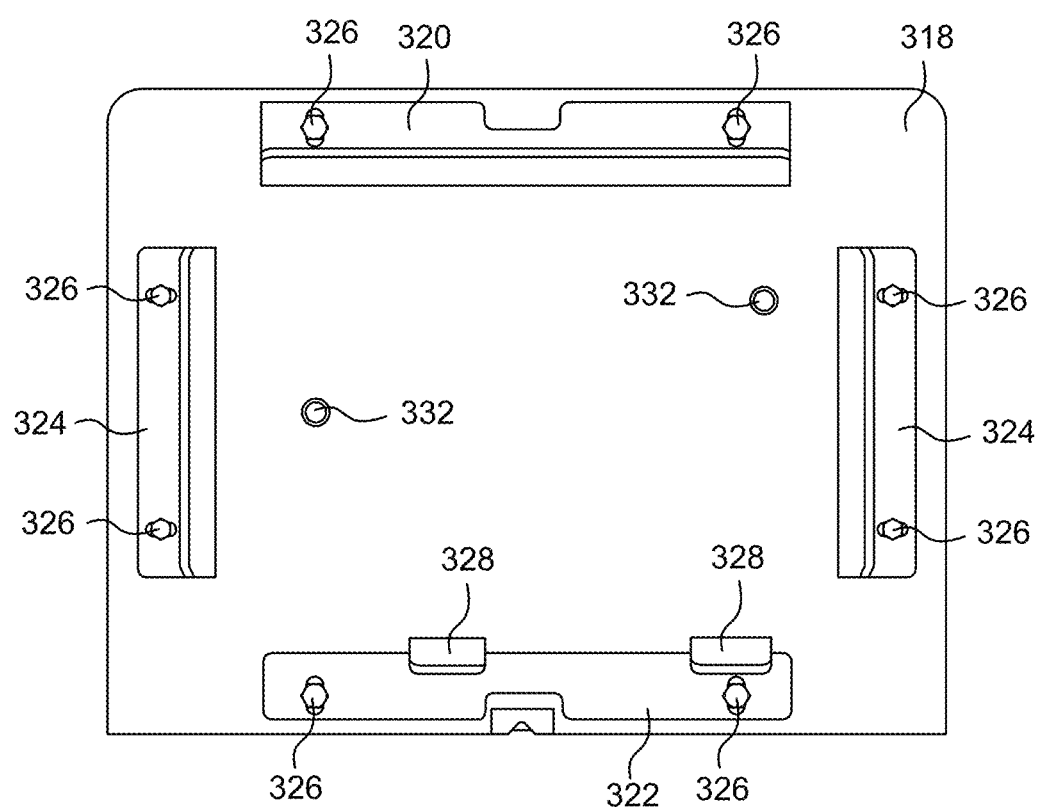
FIG. 6 is a top elevation view of the holding device of FIG. 5.
Figure 7:
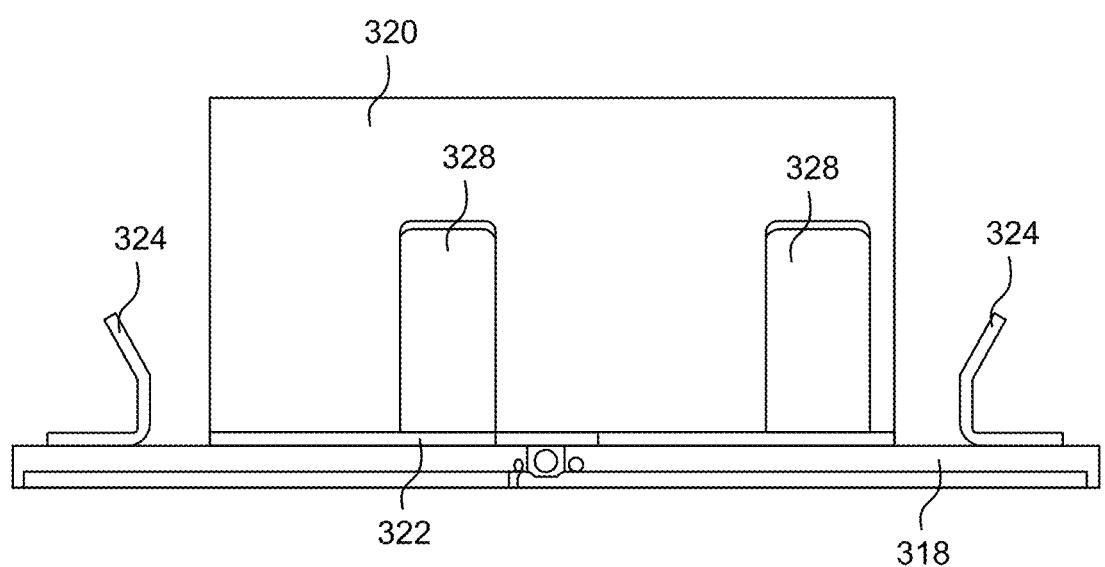
FIG. 7 is a side elevation view of the holding device of FIG. 5.
Figure 8:
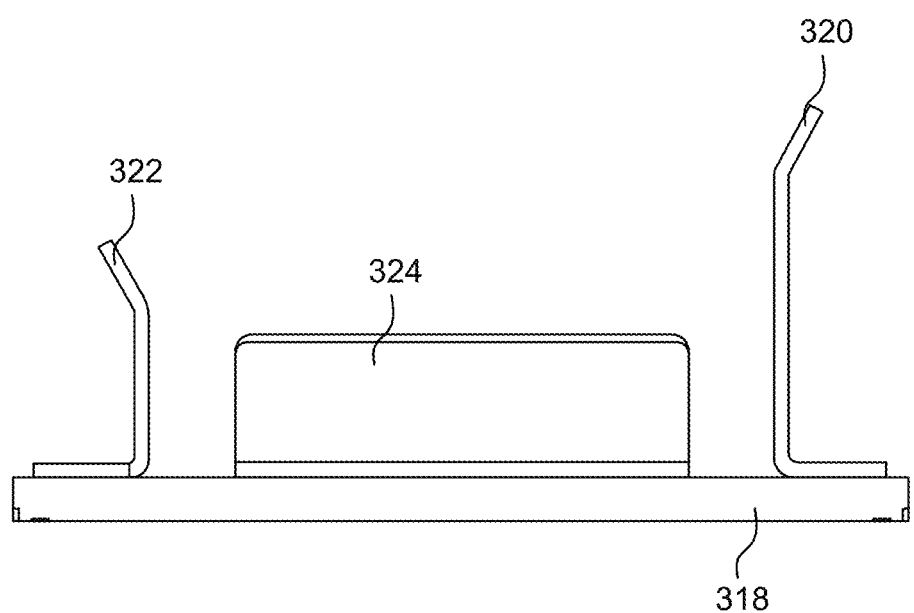
FIG. 8 is a front elevation view of the holding device of FIG. 5.
Figure 12:
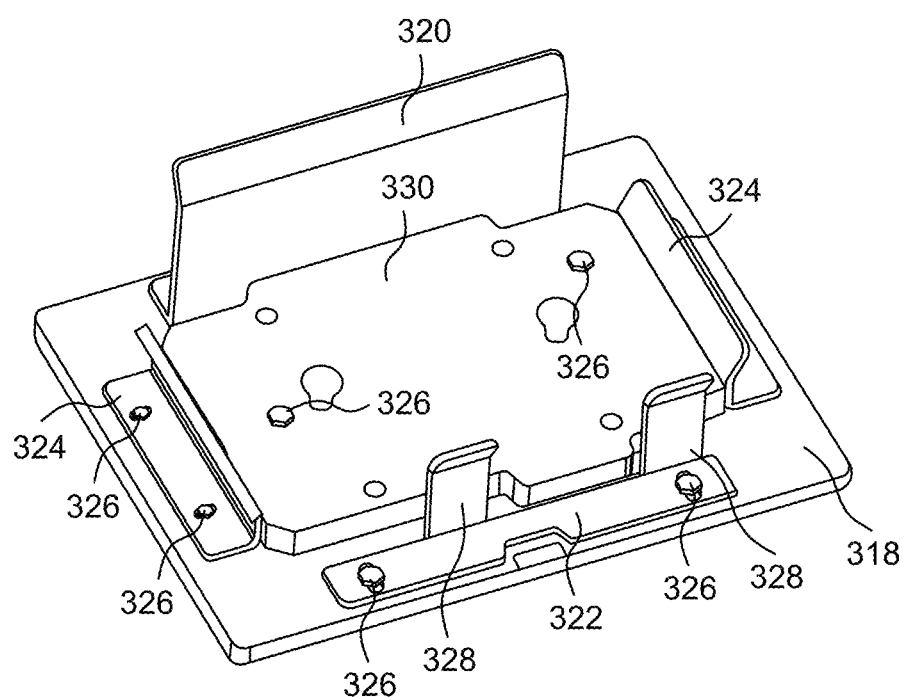
FIG. 12 is a perspective view of the holding device of FIG. 5 and with a pattern fixedly attached with a base plate of the holding device.

Referring now to FIGS. 6 and 12, during an assembly phase, a pattern 330 can be fixedly attached with the base plate 318 by threading fasteners 326 through the pattern and into tapped holes 332 in the box receiving space of the base plate 318. The pattern 330 has an outer periphery that matches the outer periphery of a box 302. Once the pattern 330 is fixedly attached with the base plate 318, the box supports 320, 322, 324 can then be positioned onto the base plate 318 such that their respective long legs contact the adjacent peripheral edge of the pattern 330. The box supports 320, 322, 324 can then be tightened onto the base plate 318, at which point, the pattern 330 can be removed from the base plate 318. This provides a simple and reliable means of attaching the box supports 320, 322, 324 in very specific locations on the base plate 318 to hold the box 302.

Referring now to FIG. 11, in the exemplary embodiment, the rail 306 is tilted or angled (i.e., not perfectly vertical) in at least one of the filling stations. Thus, when the shuttle 304 is in the filling station, the shuttle 304 tilts both itself and the box 302 carried thereon to make it easier for a person or robot to add the prescription products to the box 302. When the box 302 is tilted, the first box support 320 is on the lower side of the box 302 (i.e., on the side towards which the box 302 is tilted). The taller first height of the first box support 320 ensures that the box 302 does not tip over and spill its contents when the box 302 is tilted. In an embodiment, the box 302 may be tilted by approximately thirty degrees (30°) in a work station. In an embodiment, the box 302 may be tilted in a range of ten to forty-five degrees (10-45°) in a work station. In an alternate embodiment, the rail 306 may remain untilted in the filling station, and the shuttle 304 can be provided with an actuator which tilts the base plate 318 and the box 302 in the filling station.

Figure 15:
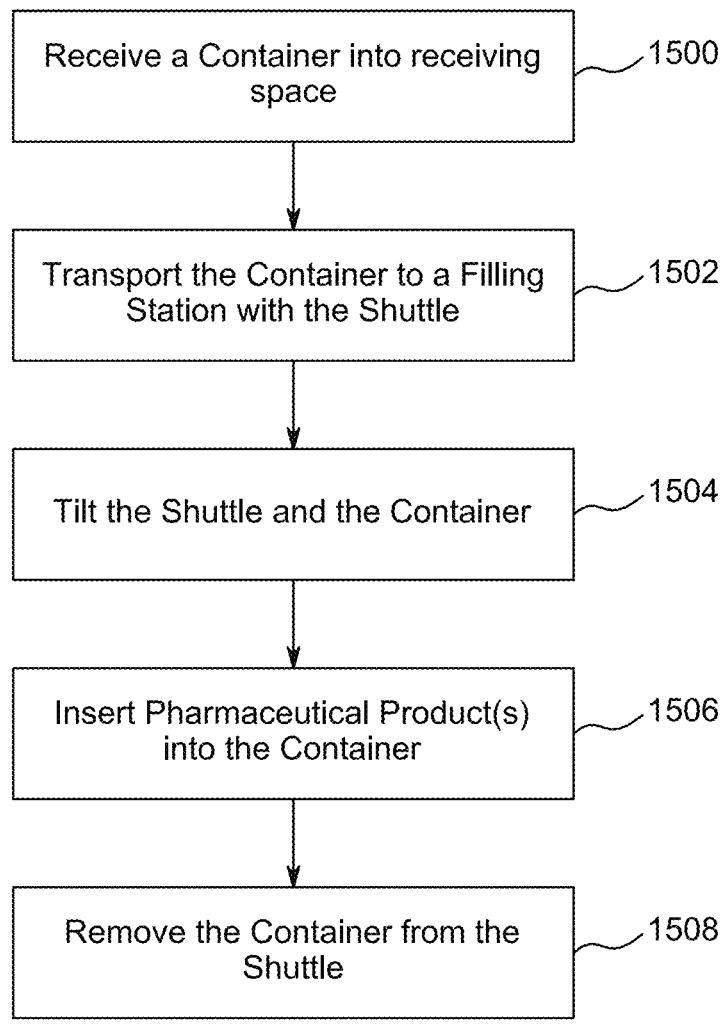
FIG. 15 is a flow chart depicting the steps of an exemplary embodiment of operating a shuttle device.

Referring now to FIG. 15, a flow chart depicting the steps of operating a shuttle system 300, the shuttle system 300 shown in FIGS. 3-14. At step 1500, a container 302 (such as a cardboard box) is received into the receiving space of the holding device of the shuttle 304. At step 1502, the shuttle 304 transports the box 302 to a work station, which can be a filling station, a pharmacist station, or a rework station. At step 1504, the shuttle 304 and the box 302 are tilted while the box supports 320, 322, 324 hold the box 302 on the shuttle 304. At step 1506, at least one pharmaceutical product is inserted into the box 302 while the shuttle is in the work station. At step 1508, the box 302 is removed from the shuttle 304.

While the present description uses a single box 302 being mounted and carried on the shuttle 304, it is within the scope of the present invention to use the present holding device to hold two or more than two boxes 302 on the shuttle 304. In an example, at least two boxes are held side-by-side with an end wall of each in direct contact with each other. The other ends of the respective box 302 is held on the holder by the end supports 324. The sides of each box 302 are held by the side supports 320, 322. The system will track the box 302 by associating a front box 302 with a first order and the rear box 302 with a second order different from the first order.

The present system can be used with the order fulfillment systems described in U.S. Provisional Patent Application Nos. 63/273,002 and 63/272,925, filed 28 Oct. 2021, titled PHARMACEUTICAL CONTAINER PROCESSING SYSTEMS AND METHODS and PHARMACEUTICAL ORDER PROCESSING SYSTEMS AND METHODS respectively, which are hereby incorporated by reference. The shuttles can move to the carriers to work station and be tracked according to the disclosure of U.S. Provisional Patent Application Nos. 63/272,667 and 63/272,671, filed 27 Oct. 2021, which are hereby incorporated by reference.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A shuttle system for conveying a container through a filling center, comprising:
   a shuttle;
   a base plate operably attached with the shuttle; and
   a plurality of support members extending vertically upwardly from the base plate and surrounding a container receiving space, the support members being configured to directly contact side surfaces of the container and to support the container as the shuttle moves through the filling center without locking the container to the shuttle.

2. The shuttle system as set forth in claim 1, further comprising a rail and wherein the shuttle is configured to self-propel itself along the rail.

3. The shuttle system as set forth in claim 2, wherein the support members are made as separate pieces from the base plate and are fixedly attached with the base plate.

4. The shuttle system as set forth in claim 3, wherein the support members are fixedly attached with the base plate via at least one mechanical fastener.

5. The shuttle system as set forth in claim 2, wherein one of the support members is a first support member that extends vertically from the base plate by a first height to support the container when the base plate is tilted towards the first support member and wherein the other support members extend vertically from the base plate by respective heights that are less than the first height.

6. The shuttle system as set forth in claim 5, wherein, in at least one filling station, the rail is tilted to tilt the shuttle and the container in a direction towards the first support member when the shuttle is in the at least one filling station to thereby allow contents to be added to the container more easily.

7. The shuttle system as set forth in claim 5 wherein one of the support members is a second support member and is positioned opposite of the first support member and wherein the second support member includes two spaced apart fingers and wherein a gripping device can grip the container in a space between the fingers when loading the container onto the shuttle or removing the container from the shuttle.

8. The shuttle system as set forth in claim 1, wherein an upper portion of at least one of the support members is angled away from the container receiving space to guide the container into the container receiving space.

9. The shuttle system as set forth in claim 1, further including a pattern that is configured to be attached with the base plate and wherein the pattern has an outer periphery that matches an outer periphery of the container and wherein the support members can be attached to the base plate around the pattern.

10. The shuttle system as set forth in claim 1 wherein the base plate and the support members are made of metal.

11. The shuttle system as set forth in claim 1, wherein the plurality support members directly contact a respective plurality of side surfaces of the container.

12. A pharmacy, comprising:
a rail extending from a loading station, through at least one filling station, and to an unloading station;
at least one shuttle on the rail and configured to receive containers at the loading station and transport the containers to the at least one filling station where at least one pharmaceutical product can be loaded into the container and to the unloading station where the container can be removed from the shuttle;
a controller in communication with the at least one shuttle and controlling the movement of the at least one shuttle through the pharmacy along the rail;
the shuttle including a base plate and a plurality of support members extending vertically from the base plate, the support members being spaced apart from one another to define a container receiving space which receives the containers; and
wherein when one of the containers is received in the container receiving space, the support members hold the container on the shuttle in a non-locking manner.

13. The pharmacy as set forth in claim 12, wherein the rail is angled within the at least one filling station to angle the container when the shuttle is in the at least one filling station and wherein at least one of the support members extends vertically by a greater height than the other support members to hold the container when the container is angled in the at least one filling station.

14. The pharmacy as set forth in claim 12, wherein at least one of the loading and unloading stations includes a suction cup mechanism and wherein one of the support members includes a pair of fingers that are spaced apart from one another so that the suction cup mechanism can access an outer surface of the container in an area between the fingers.

15. The pharmacy as set forth in claim 12, wherein the support members have upper portions that are angled away from the container receiving space for guiding the containers into the container receiving space.

16. The pharmacy as set forth in claim 12, wherein the support members are made as separate pieces from the base plate and are fixedly attached with the base plate.

17. A method of operating a shuttle system, comprising the steps of:
in a loading station, receiving a container into a container receiving space between a plurality of spaced apart support members that extend upwardly from a base plate of a shuttle and wherein the support members hold the container in a non-locking manner;
transporting the container with the shuttle from the loading station to at least one filling station;
inserting at least one pharmaceutical product into the container in the at least one filling station; and
unloading the container from the shuttle in the unloading station.

18. The method as set forth in claim 17, further including the step of tilting the shuttle and the container in the at least one filling station and wherein one of the support members extends to a greater height than the other support members to support the container when it is tilted.

19. The method as set forth in claim 18, wherein the step of inserting at least one pharmaceutical product occurs while the container is tilted.

20. The method as set forth in claim 17, wherein one of the support members includes a pair of spaced apart fingers and further including the step of gripping an outer surface of the container in a space between the fingers.

21. The method as set forth in claim 17, further including the step of fixedly attaching the support members with the base plate around a pattern which has an outer periphery that generally matches an outer periphery of the containers.

* * * * *